Feb. 22, 1955 F. BLOCH ET AL Re. 23,950

METHOD AND MEANS FOR CHEMICAL ANALYSIS BY NUCLEAR INDUCTIONS

Original Filed Dec. 23, 1946 2 Sheets-Sheet 1

INVENTORS
FELIX BLOCH AND
WILLIAM W. HANSEN
BY
Paul B. Hunter
ATTORNEY

INVENTORS
FELIX BLOCH AND
WILLIAM W. HANSEN
BY
Paul B. Hunter
ATTORNEY

United States Patent Office

Re. 23,950
Reissued Feb. 22, 1955

23,950

METHOD AND MEANS FOR CHEMICAL ANALYSIS BY NUCLEAR INDUCTIONS

Felix Bloch, Palo Alto, Calif., and William W. Hansen, deceased, late of Stanford University, Calif., by Olive D. Ross, executrix, Palo Alto, Calif., assignors of one-half to said Felix Bloch and one-half to James L. Hansen, Palo Alto, Calif.

Original No. 2,561,489, dated July 24, 1951, Serial No. 718,092, December 23, 1946. Application for reissue July 22, 1952, Serial No. 300,364

61 Claims. (Cl. 324—35)

Matter enclosed in heavy brackets [ ] appears in the original patent but forms no part of this reissue specification; matter printed in italics indicates the additions made by reissue.

This invention relates to the detection and identification of particular kinds of atoms, and more specifically to electrical methods for accomplishing this result.

The objects of this invention are to provide method and means for rapid qualitative and quantitative chemical analysis. To provide method and means for analyzing for chemical elements without the destruction of the sample. To provide method and means for analyzing for a large number of chemical elements in a single sample. To provide method and means for differentiating between the isotopes of a single element. To provide method and means for measuring the precession frequency of the nuclei *or portions* of atoms in a prescribed magnetic field. To provide means for establishing resonance between the precession frequency of the nuclei *or portions* of the atoms in a substance and the oscillations of a radio frequency oscillator. To provide coupling by means of nuclear precession between a coil producing an alternating magnetic field, and another coil oriented at right angles to said first coil. *To provide coupling by means of the precession of portions of atoms between translating means providing an alternating magnetic field and another translating means oriented at right angles to said first translating means.* To provide means for accomplishing a cyclic variation of the precession frequency of the nuclei relative to the oscillation frequency of the coil, and means for indicating the cyclic coincidence of the two frequencies. To provide means for modulating the frequency of the precession of the nuclei so that it will periodically coincide with the frequency in a coil, and to provide means for indicating said coincidence. To provide means for modulating the frequency in a coil so as to periodically coincide with the frequency of precession of prescribed nuclei in a prescribed magnetic field, and means for indicating said coincidence. To provide means for increasing the coupling between the precession of the nuclei and the thermal motion of the medium in which the nuclei exist. To provide means for reducing the coupling of two coils approximately at right angles to each other to a minimum. To provide means for measuring the presence of paramagnetic molecules by their effect on the damping of nuclear precession of another type of atom. To provide means for tracing the course of certain reactions involving a change of valence, in which the element being traced is paramagnetic in one valence and diamagnetic in another. To provide means for the accurate measurement of magnetic fields.

In order to explain this invention, it is first necessary to acquaint the reader with a few of the known facts about the structure of the atom, and for this purpose we present the following rather brief statement. More extended treatment can be found in any text on atomic theory: the one that follows merely states the facts without adducing proof and omits many important features not of interest here.

Any atom consists of a small heavy positively charged center, called the nucleus, surrounded by a relatively extensive diffuse cloud of electrons. Normally, the total charge of the atom is zero so that the nucleus carries a positive charge equal to the negative charge of the external electrons. The nucleus then contains all of the positive charge and most of the mass associated with any atom. When one wishes to specify these quantities they are usually measured in terms of the charge on the electron, $e$ and the mass of a proton, or hydrogen nucleus. The usual symbols are Z and M, a nucleus with atomic number Z and mass number M having a positive charge Ze and a mass M times the mass of a proton.

Under all ordinary circumstances the atoms interactions with the external world occur by way of its external cloud of electrons and so the arrangement of these electrons determines the gross, or chemical properties of the atom. Thus oxygen and nitrogen have different chemical properties because their external electrons are differently arranged.

This arrangement depends, naturally enough, on the number of electrons per atom. This number depends in turn on the nuclear charge Z so that if we know the nuclear charge and so the number of electrons we know the chemical species. It is for this reason that Z is called the atomic number, since it specifies the chemical species of atom.

In addition to charge, the nucleus has mass. If, for example, we measure the mass of oxygen nuclei we find that most of them have mass 16, and a few have masses 17 and 18. Such atoms, with the same number of electrons and so the same chemical properties, but different masses, are called isotopes.

Generally speaking, the mass numbers are roughly twice the corresponding atomic numbers, and the number of isotopes for a given Z increases as Z increases. That is, for the lighter chemical elements there are for any given Z only a few possible values of M while for the heavier chemical elements a number of different masses are possible for a given Z.

Ordinarily, the various isotopes occur in nature in fixed proportions. For example, chlorine has two isotopes of masses 35 and 37 and these always occur in a mixture such as to give a mean mass, or chemical atomic weight, of 35.5.

In addition to charge and mass, discussed above, the nucleus may have other properties. Two important ones that have been discovered are spin and magnetic moment.

It has been known for some time that the nuclei may have spin or angular momentum i. e. may act like a small gyroscope. Part of this angular momentum comes from the angular momentum, or spin, of the elementary particles which go to make up the nucleus, and part comes from the revolution of the component particles about the center of mass. This angular momentum is closely related to the spin of the electrons which rotate about each nucleus and in addition spin upon their axes and act as small gyromagnetic resonators. For present purposes, we need not be concerned with the rather imperfectly understood details of the intra-nuclear motions; all we need to know is that the nucleus as a whole has a total angular momentum. By well verified quantum laws, this angular momentum must be a multiple of $h/2\pi$ where h is Planck's constant. If we write the angular momentum as $Ih/2\pi$ then I may have the values 0, 1/2, 1, 3/2 etc., but intermediate values never occur. It should be here pointed out that a particular species of nucleus with a particular value of M and Z never changes its value.

This nuclear angular momentum or spin has been measured for a number of nuclei and it is found that while I might, in principle, have any integral or half integral value, no value greater than 9/2 has even been observed. It follows that with only ten spin values and some hundreds of nuclei, in general many different nuclei can be found having a given spin value. No simple relation between Z and/or M and the spin has been found, except that nuclei with even M often have zero spin. Thus, one cannot predict from Z and M the spin value of an atom. Its value must be measured.

One might expect that a body, such as a nucleus, containing charged particles which are known to have a total angular momentum, might also exhibit magnetic properties due to the motion of the charged particles. This expectation is verified and nuclei in general behave as if they contained circulating currents. The magnitude of such currents is best measured by the magnetic moment $\mu$ exhibited by the nucleus. A convenient unit is the nuclear magnetron $eh/4\pi Mc$ with e the charge on the electron, h Planck's constant, M the proton mass, and c the velocity of light.

A number of nuclear magnetic moments have been measured and it is observed that: (a) if the spin is zero the magnetic moment is likewise (b) although only integral or half integral values of I are possible, any value of $\mu$ may occur and (c) no simple general relation between Z, M, I and $\mu$ has been found.

Thus any given nucleus has at least four properties; its charge, which determines the chemical properties of the associated atom; its mass; its spin or gyroscopic moment; and its magnetic moment.

Now a nucleus with given Z and M values will also have definite values of I and $\mu$ and these values of I and $\mu$, if they can be determined, will determine Z and M values so that a method of measuring I and $\mu$ is, in general, a method of determining Z and so is a method of chemical analysis. An important exception occurs when I and $\mu$ are zero for then the atomic species is not determined. Practically this case does not occur very frequently because most elements are mixtures of various isotopes and usually at least one isotope will have a non zero spin and moment.

The present invention is a method of measuring $$\frac{\mu}{I}$$

From them Z can be found and so chemical analysis may be accomplished.

Before describing the present invention in detail, it will be useful to explain the behavior of nuclei or other systems *such as electrons* with angular momentum under the influence of torques.

Consider first what happens when a nucleus is placed in a constant magnetic field H which we will suppose to be in the vertical direction. Since the nucleus will generally have a magnetic moment, just as a compass needle has magnetic moment, one would at first expect the nuclear moment to line up with the applied magnetic field, just as the moment of the compass needle lines up with the earth's field. Actually, this is usually what happens eventually, but the process is more complex than appears at first sight.

This complexity arises because the nuclear magnetic moment is associated with a mechanical angular momentum so that gyroscopic effects arise.

Since this angular momentum is a multiple of Planck's quantum constant, one might expect that a quantum mechanical treatment would be needed but it has been shown by Kramers that in systems of the type here considered which have only one spin and one momentum value, the quantum mechanical and the classical treatments must always lead to the same result and so one may without prejudice, use either description. We choose here to use the language of classical mechanics since it is more familiar to the general reader.

Returning then to the case of a system with angular momentum acted on by a torque caused by the interaction between the nuclear magnetic moment and the external magnetic field, we observe that since the magnitude of the angular momentum is fixed the only possible change is in the orientation. This orientation of the angular momentum vector changes steadily but always maintains a constant angle with the magnetic field so that the momentum vector moves on the surface of a cone with axis parallel to the magnetic field. This motion is commonly called precession and the reasons for it and the equations governing it may be found in any treatise on gyroscopes.

The problem is, in fact, exactly similar to that of a gyroscope acted on by gravity in which case it is well known that the gyroscope does not fall over but precesses with the axis making a constant angle with the vertical. In the absence of friction or other damping, this precession would continue indefinitely, and the gyroscope would never be oriented by the torque due to gravity.

The angular rate at which this precession occurs depends on the torque applied and the angular momentum being larger for larger torques and for smaller angular momenta. Thus, in the nuclear case the rate of precession is proportional to $\mu H/I$ its actual value being $(e/2Mc)(\mu H/I)$. It will be observed that this frequency is independent of the angle which the nuclear moment makes with the field H. This frequency of precession is often called the Larmor frequency.

Thus we see that, in the absence of damping forces, nuclei when placed in a magnetic field would not line up therewith but would precess continually about the axis established by the magnetic field. Actually damping forces do exist, as has been discovered by the present inventors, and just as friction on a gyroscope eventually causes it to assume a position of lowest potential energy in the gravitational field, i. e. line up with the field, so these damping forces eventually suppress the nuclear precession and so allow the nuclear moments to line up with the magnetic field.

A quantity of great importance, for present purposes, is the time required for these damping forces to act and this time we call the relaxation time. Experiment shows that this time may have values extending from $10^{-5}$ seconds or less to many minutes or more.

In addition to the gyroscopic and magnetic forces, and the damping forces, as described above, there exists a third type of effect of importance; namely, that due to thermal motion. It is well known that as a result of such motions, the probability that a system in equilibrium with its surroundings at absolute temperature T will have an energy E is proportional to $e^{-E/kT}$ where k is Boltzman's constant. As a result it is most probable that any given system will choose, for example, the lowest of two possible energies. The difference in probabilities will be small if the energy difference is small compared to kT and vice versa.

In the case of present interest the energy that the nucleus can gain by aligning itself with the magnetic field is of the order $\mu H$ and, on substituting numbers it will be found that this is about a million times less than kT. As a result, although any nucleus is most stable when lined up with the magnetic field, and although the damping forces permit it to so line up, the resulting stability is so small compared to the energy kT of thermal agitation that the orientation is determined mostly by chance and only slightly by the magnetic torque between the nuclear moment and the magnetic field. Thus if we considered 1,000,001 nuclei of spin $I=1/2$ in a magnetic field of 1000 gauss or thereabouts we might find 500,001 pointed with the field and 500,000 pointed against. The exact value of the difference depends, of course, on the moments, fields and temperatures involved, but the above numbers are representative.

It might be thought that the description of the behavior of an ensemble containing 500,000 nuclei pointed one way and 500,001 pointed the opposite way would be quite complex. Actually it is surprisingly simple, for all the nuclei precess at the same rate so that one can cancel the 500,000 moments pointed against the field by 500,000 of the 500,001 oppositely oriented but similarly precessing nuclei. The end result is exactly the same as though there was a single nucleus aligned with the field, the others simply cancelling off.

To summarize: The combined effect of the nuclear angular momentum and the torque exerted by a magnetic field and on the nuclear magnetic moment is to cause the nucleus to precess at a frequency called the Larmor frequency. This precession would continue indefinitely were it not for damping forces which allow the nucleus to line up with the field. The time required for this alignment is called the relaxation time. Finally, because of large thermal forces which tend to give random orientations to the nuclei, the total orientation achieved by the torques acting on the nuclear moments is quite small.

We may also state that, with the exception of the effects of thermal forces, all the things we have described as happening to nuclei in a magnetic field in consequence of its angular momentum and the torque due to its magnetic moment are also known to happen to an ordinary gyroscope when acted on by similar torques. In fact one might by combining a gyroscope and a bar magnet make a model which would exhibit all the phenomena of present interest.

Let us next consider a slightly more complex case in which, in addition to the constant magnetic field $H_0$ in the vertical or Z direction, there is a magnetic field $H_1$ at right angles to $H_0$ and with orientation which rotates about $H_0$ with uniform angular velocity $\omega$. In general, we will suppose that $H_1$ is much less than $H_0$.

Moreover, to simplify the treatment, we will assume that the nuclei have been in the field long enough so that any transient terms in the motion have been damped out, i. e., they have settled down to their final steady motion.

This motion can be found by setting up suitable differential equations and solving them, but it can also be obtained in an instructive qualitative manner, as follows:

In the first place, since all transients have damped out, any cyclic motion of the nuclei must occur with the angular frequency $\omega$ of the impressed rotating field $H_1$. Thus if the nuclear angular momentum vector rotates, it must do so at frequency $\omega$ and must therefore rotate in synchronism with the field $H_1$. Now, since we are searching for a state of steady motion, no work can be done on the nucleus as otherwise its energy would vary.

This means that $\mu$, $H_1$, and $H_0$ must lie in the same plane since then the torque between $\mu$ and $H_1$ will do no work. Thus we have a state in which the nuclear angular momentum vector precesses about $H_0$, always lying in the plane defined by $H_0$ and the rotating $H_1$.

The nuclear angular momentum thus makes a constant angle, which we call $\theta$, with the Z axis defined by $H_0$. To complete the description we must say what determines this angle.

It is apparent that two torques act on the nucleus, the one due to the interaction between $\mu$ and $H_0$, and the other due to $\mu$ and $H_1$. Moreover, when $\theta$ is small, the former is nearly zero while the latter is a maximum. On the other hand, when $\theta=90°$ and $\mu$ is lined up with $H_1$, the torque due to $H_0$ is a maximum and that due to $H_1$ is zero. Also, when $\theta$ varies, the rate of change of angular momentum, for a given rate of precession, varies.

What happens then, is this. The nucleus adopts an angle $\theta$ such that the combined torques due to $H_0$ and $H_1$ give a rate of precession just equal to $\omega$. In this way the nucleus is able to fulfill the assumption that it would precess at a rate just equal to that of the field $H_1$.

Or, to make a mechanical analogy which is more readily grasped, the combined action of all the nuclei is equivalent to a single gyroscope with a bar magnet for a shaft as shown in Fig. 1. The bar magnet is subjected to two torques acting in the plane defined by one of the torques and the axis of the bar magnet. Since the bar magnet and both torques are in the same plane, the two torques must add to or subtract from each other, and since these two torques vary in relative magnitude depending on the angle of the axis of the bar magnet, a very wide range of resultant torques are possible corresponding to a wide range of precession rates. Hence there is always an angle of inclination of the bar magnet which will give a precession rate in agreement with any rate of rotation of the magnetic field $H_1$.

This is one of two possible steady motions. As a little consideration will show, the other may be obtained by simply reversing the orientation of the nucleus.

This is so because in making this change the directions of the torques of both magnetic fields are reversed, but their magnitudes are unchanged. Hence their resultant is reversed in sign but unchanged in magnitude, but since the gyroscope is turned over, this change of sign does not change the direction of precession.

Up to this point it has been merely stated that the field $H_1$ is a rotating magnetic field. Such a rotating magnetic field could be established in the same way as a rotating magnetic field is established in a polyphase electric motor, but in practice it is usually inconvenient to do this. Actually a sinusoidally alternating magnetic field such as provided by coils 1 of Fig. 1 is all that is necessary, since such a field is equivalent to two magnetic fields of equal strength rotating in opposite directions. The component rotating in the direction of nuclear precession will produce the results described above, whereas the component going in the opposite direction will produce no result since twice in every rotation the direction of the applied torque reverses effecting complete cancellation.

In what follows we will, for simplicity, assume: (a) that sufficient time has elapsed for the steady motion to be established, (b) that we consider only the excess nuclei oriented with the field and (c) that any variations in $\omega$ hereafter described take place in a time short compared to the relaxation time. Assumption (b) is always justifiable but (a) and (c) are only correct if the nuclei have been in the field for a time long compared to the relaxation time or the time required for the nuclear poles to reach their maximum alignment in the applied field, while all variations in $\omega$ are made in a time short compared to the relaxation time. These assumptions are by no means always true, but when they are not, the apparatus may still work, though in a slightly more complex manner. Descriptions of the detailed behavior under such circumstances may be found in papers to be cited, but we can give here sufficient information for practical purposes without use of excessive mathematics. The two main effects are: (a) the semi angle of the precsssion cone $\theta$ may not follow variations in $\omega$ with perfect fidelity and (b) the nuclear moments will no longer lie in the rotating plane defined by $H_0$ and $H_1$. While taking these possibilities into account introduces considerable mathematical complexity, the main practical points are not altered, namely that the nuclei can be forced to precess and that as will be explained presently, this precession can be detected by the voltage induced by the rotating magnetic moments.

It will be seen from the above that the relaxation time plays an important role and it is therefore important to state that we have discovered that this time may be varied over a wide range by introducing what we call a catalyst. Such catalysts greatly alter the rate at which equilibrium is established, but do not participate in any other way. Any atom, molecule, ion, etc. possessing a permanent magnetic moment in the electron part of the atom, i. e., any paramagnetic substance may act as a catalyst. For example, we have used paramagnetic salts of iron and manganese and have also used dissolved oxygen.

To return now to the behavior of precessing nuclei, we have seen that the angle $\theta$ is established by a balance between the effects of $H_0$ and $H_1$ which gives a precession at angular rate $\omega$. The angle $\theta$ may therefore be expected to depend on $\omega$, $H_0$, and $H_1$. Suppose first that $\omega$ is very small so that the nuclei must precess slowly. This means a small torque which is achieved by a small value of $\theta$ which corresponds to the magnetic moment $\mu$ being almost lined up with the strong field $H_0$. Now if we increase $\omega$, $\theta$ will increase also until when $\omega=\omega_0$ we wish the moments to precess at the Larmor frequency. But this is exactly the frequency they would have under the influence of $H_0$ alone; we therefore find the nuclei lined up with $H_1$ so that $H_1$ produces no torque. Thus when $\omega=\omega_0$ the nuclei point at right angles to $H_0$. If we increase $\omega$ still further, more torque to give the faster precession may be had by making $\theta$ greater than 90° so that both $H_0$ and $H_1$ contribute torque. As $\omega$ continues to increase, so does $\theta$ and finally, for values of $\omega$ notably higher than $\omega_0$ the nuclei point against $H_0$, i. e., they have been "turned over." If now $\omega$ is decreased, the process will reverse and at low values of $\omega$, the nuclei will again point with the field.

Likewise, it will be found that if we start with the nuclei pointed with $H_0$, and a high value of $\omega$, that lowering through the Larmor value $\omega_0$ will turn the nuclei against $H_0$, the process being reversed as $\omega$ is returned to its original high value.

Entirely similar effects may be obtained by varying $\omega_0$ instead of $\omega$, this being done by varying $H_0$.

We are now in a position to understand a detailed description of the apparatus of the present invention and the functioning thereof.

Referring to the drawings.

Figure 1:
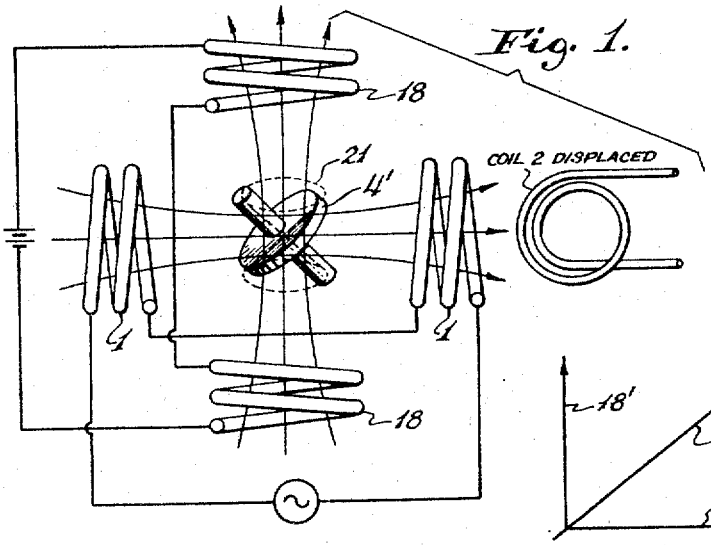
Fig. 1 is a schematic drawing illustrating the gyroscopic precession of an atomic nucleus.

Referring now to Fig. 1, there are three sets of coils—1, 16, and 2 respectively with mutually perpendicular axes.

Coil 2 is shown to one side of the drawing for convenience, but its actual position is with axis perpendicular to the plane of the drawing and with the axis intersecting this plane in the region between coils 1 and 18.

Figure 2:
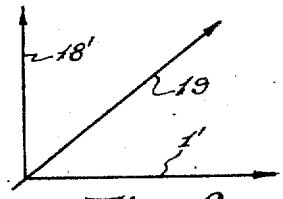
Fig. 2 is a vector diagram also explanatory of the precession of the nucleus.

Such axes are shown in Fig. 2 where the axes 1′ and 18′ are parallel to coils 1 and 18. Coil 2 would then have its axis parallel to 19 which is at right angles to both 1′ and 18′.

Also shown in Fig. 1 is a gyroscope 4′ which represents the angular momentum of a nucleus and, in dotted lines, a precession cone 21.

The coils 18 carry a steady or slowly varying current and produce the magnetic field previously designated as $H_0$. It is often convenient to provide iron cores and return yoke for these coils. The coils 1 are supplied with R. F. current of angular frequency $\omega$ where by angular frequency we mean $2\pi$ times the frequency in cycles per second. This alternating current produces an oscillating magnetic field of magnitude $2H_1 \cos \varpi t$. This oscillating magnetic field may be considered as the sum of two rotating fields, just as may be done, for example, in considering the field in a single phase induction motor. As has been shown by Bloch and Siegert for another but similar problem, we need consider only the component which rotates in the same direction as the Larmor precession, the other rotating componet produces rapidly oscillating torques on the nuclei and these average to zero.

The atoms whose nuclei are to be studied are placed in the fields due to coils 18 and 1 whereupon the rotating field produced by coils 1 causes the nuclei to precess in the field $H_0$ due to coils 18.

The precessing nuclei, because of their magnetic moment, constitute a rotating magnet and this rotating magnet induces voltages in coil 2 whose axis is at right angles to coils 1 and 18. This voltage may be amplified by a suitable amount and measured, its magnitude constituting a measure of the magnitude of the nuclear moments.

We may explain further by reference to Fig. 2 which shows mutually perpendicular axes in space 1′, 18′, and 19, 1′ being parallel to the axis of coils 1, 18′ being parallel to the magnetic field produced by coils 18 and 19 being parallel to the axis of pickup coil 2. The nuclei then precess about the field $H_0$ along the axis 18′ under the influence of a rotating component of an oscillating field in the direction 1′. Their precession causes an oscillating field in the direction 19 and so induces a voltage in coils 2.

The magnitude of the oscillating field, and the voltage resulting therefrom, depends on the angle between the precessing nuclei and the axis 18′ and this in turn depends, as explained above, on the relation between the angular frequency $\omega$ with which the driving field rotates and the angular Larmor frequency $\omega_0$. When the driving field due to coils 1 has frequency nearly equal to the Larmor frequency the nuclei revolve nearly in the plane defined by 1 and 19′ and the voltage in coil 2 is large, when the angular frequency $\omega$ is far from $\omega_0$ the voltage in coil 2 is small.

Figure 3:
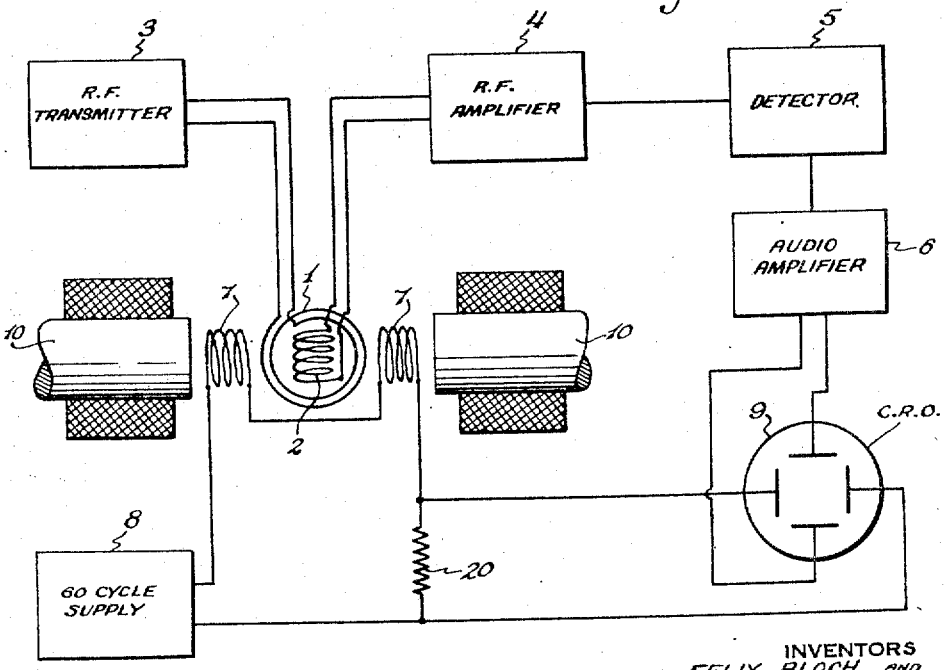
Fig. 3 is a circuit diagram of the apparatus.
Figure 4:
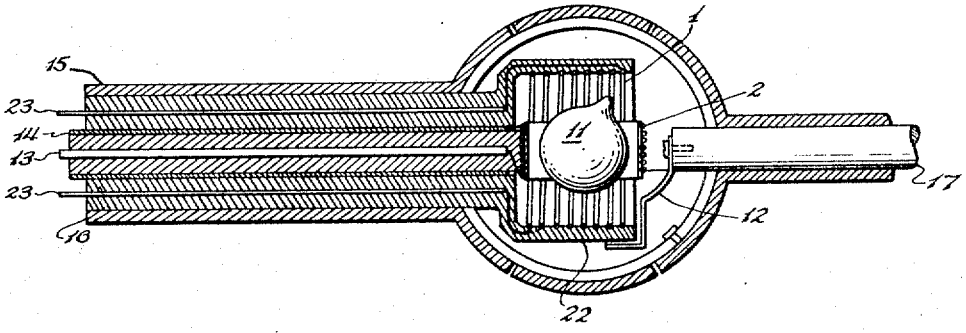
Fig. 4 is a cross section of the pickup head showing a part of the magnet poles and coils.

Further practical details may be understood with the help of Figs. 3 and 4 which relate to an apparatus used in tests of the detection method here described.

Fig. 3 is a block diagram and shows diagrammatically the poles 10 of an iron core magnet producing field in the direction hitherto described as 18′. This field is varied cyclically by a 60 cycle current passing from source 8 through coils 7 and resistor 20. In this manner $H_0$ and so $\omega_0$ is varied relative to the driving frequency $\omega$. Voltage across resistor 20 is applied to the horizontal plates of cathode ray tube 9. The horizontal deflection of the cathode ray beam is thus proportional to the deviation of $H_0$ or $\omega_0$ from the mean value determined by the steady field due to poles 10 and the magnet coils appertaining thereto. Radio frequency power of angular frequency $\omega$ is supplied by a transmitter 3 to an apparatus consisting of coils 2 and 1 and associated shields and designated as an R. F. head. Inside this R. F. head nuclei precess in the manner described previously and induce a voltage which is led to amplifier 4 which increases its magnitude sufficiently to operate detector 5, the output of which is proportional to the magnitude of the R. F. voltage supplied by 4. This voltage varies, rising to a maximum when $\omega_0$ is equal to $\omega$ and decreasing at other times. These variations are amplified by audio amplifier 6 and finally govern the vertical deflection of the spot of cathode ray tube 9.

Thus as the field $H_0$ and so $\omega_0$ is varied, the cathode ray spot moves horizontally while, at the same time, the vertical deflection of the spot is a measure of the magnitude of the voltage induced by the precessing nuclei. Thus a curve of voltage induced as a function of $\omega_0$ is traced out on the cathode ray screen. This process being repeated cyclically 60 times a second; persistence of vision causes the curve to appear as fixed and stationary on the cathode ray screen.

In this way the field giving maximum voltage, and so the field giving $\omega_0=\omega$ may easily be found.

Likewise by suitable apparatus not shown, but obvious to anyone skilled in the art, the magnitude of the voltage entering 4 may be measured and so the magnitude of the precessing moment may be determined.

Referring now to Fig. 4 we may describe the contents of the R. F. head. The coil 1 is shown, it being wound on the inside of a form 22. The current for this coil is carried by leads 23. Inside this coil is glass bulb 11 which contains the sample of material under study. The field produced by the rotating field in sample 11 induces voltages in coil 2 and this voltage is carried out for observation by means of a coaxial line with outer conductor 14 and inner conductor 13. The whole is surrounded by a shield 15, 16, which is split at suitable points to avoid 60 cycle eddy currents due to coils 7. Also provided is a so-called paddle 12 which consists of a more or less semicircular cap of copper rotatable by shaft 17.

Figure 5:
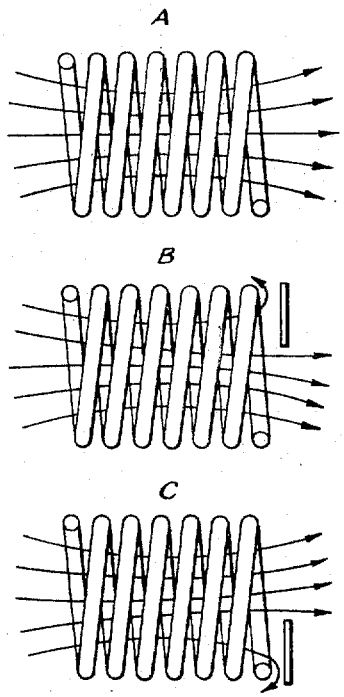
Fig. 5 is a schematic view to explain the action of the trimmer paddle.

The function of paddle 12 may be explained with the help of Fig. 5.

Although coils 1 and 2 are nominally at right angles it is inevitable that, because of slight errors in construction, this perpendicularity will not be perfect and as a result some flux from coil 1 may link coil 2. Usually this leakage flux will be many times the flux due to the precessing nuclei and so the leakage flux may mask the effects due to the nuclei.

This leakage flux may be regulated by means of paddle 12. Being of a good conductor, such as copper, this paddle has induced in its eddy currents which prevent the flux from penetrating the paddle. Thus, Fig. 5A shows qualitatively the field due to coil 1 without the paddle while Fig. 5B shows the flux with the paddle in one position and Fig. 5C shows it in a diametrically opposite position. It is apparent that, by means of the paddle, the flux lines inside 1 may be made to slope either up or down. Thus the flux may be made to link coil 2 in either direction and it must therefore be possible by suitably orienting paddle 12 to greatly reduce the flux linkage coil 2.

It is found that the limit in their reduction is set by the finite conductivity of the copper of which the paddle is made. As a result of this finite conductivity the currents induced in the paddle are not quite 180° out of phase with the currents in coil 1. As a result while fields of the same phase as the currents in coil 1 may be reduced to zero, a small field in time quadrature therewith will remain. Thus although the voltage induced in coil 2 can be reduced enormously it will not in general be possible to make it zero by means of the apparatus shown.

This slight leakage from transmitter to receiver is not a handicap, in fact if it were not naturally left by the paddle one would usually devise other means for introducing a small signal.

There are two reasons for this.

First, it is well known in the art that detectors, such as 5, are very inefficient and have a poor signal noise ratio when operated at a very low level for they are then in the square law region. The voltages induced by the nuclei are small and would usually lead to operation in the undesirable square law range. This is avoided by adding a constant leakage from the transmitter, the total voltage then being sufficient to operate the detector in the linear range.

Second, the addition of a relatively large leakage to the small voltage due to the nuclei has the result that the only variations in nuclear signal that influence the detector are variations having a component that is in phase with the leakage signal, since variations in quadrature component only cause second order variations in the amplitude of signal fed to the detector. Thus by varying the phase of the leakage signal one can study at will either the nuclear voltage that is in phase with the current in coil 1 or that which is in quadrature therewith.

For most purposes, the residual leakage left by the simple paddle arrangement above described is of the most interesting phase and has about the right magnitude.

When this is not so leakage of any desired magnitude and phase may be introduced by connecting transmitter 3 and receiver 4 by means of a phase shifter and variable attenuator.

The earliest results obtained using the apparatus of Figs. 3 and 4 was concerned with the nuclear induction effect for hydrogen. Hydrogen is a highly satisfactory substance to use for initial investigations because it has the highest gyromagnetic ratio of any atom and a high concentration of hydrogen is present in water and many organic substances. These two facts insure a strong signal with relatively weak magnetic polarizing fields. The first signals were obtained from a sample containing only 1/10 c. c. of water. Samples were later increased to 1 c. c.

One striking demonstration of clear resonance is obtained by raising the steady field slightly above the resonance point and then turning it off. The field in a large magnet dies somewhat gradually when the current is turned off, and the signal may be seen to suddenly appear as the magnetic field passes through the resonant value, or the value for which the axes of the nuclei are precessing at 90° to the magnetic field. Numerous other variations of the method of operation all gave results consistent with the theory. Work also *has* been done on the heavy hydrogen, fluorine, etc., with equally satisfactory results.

Figure 6:
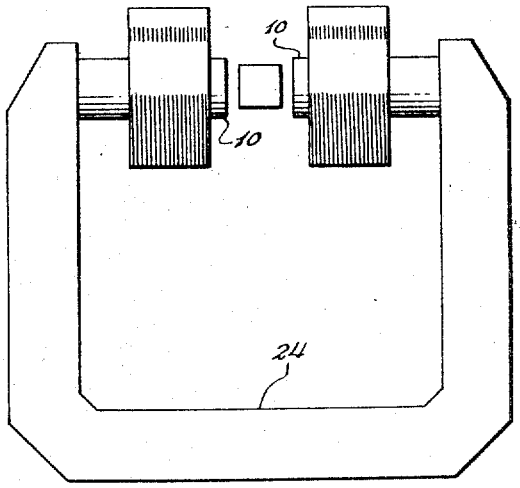
Fig. 6 is a cross section of the electro-magnet with the pickup head in place.

Finally, in Fig. 6 we show the apparatus as it appears set up in the laboratory. Here 24 is a large electromagnet which replaces the diagrammatic coils 18 and the R. F. head is shown between its poles 10. It is clear after a moment's thought that if magnet 24 has a field of unknown strength, that field can be measured by use of a sample containing known atoms, whereas if the atoms are known, they can be identified if the field strength is known.

To sum up the operation of the present invention as a means of chemical analysis: The substance under investigation is placed in an apparatus as described and the nuclei caused to precess under the combined action of a steady field $H_0$ and an R. F. field of angular frequency $\omega$. The voltage induced by this precession reaches a maximum when $\omega$ and the Larmor frequency $\omega_0$ approach coincidence. By finding this maximum the Larmor frequency is determined. This Larmor frequency is proportional to $\mu H_0/I$ and, knowing $H_0$, $\mu/I$ can be found. Since different nuclei have different values of $\mu/I$ a determination of this quantity identifies the nuclear species present. Measurements of intensity may also be made to determine the number of nuclei present.

It will be apparent from the many statements made above about nuclear spins and moments that these quantities have been measured by others before the present inventors introduced the device here described. The methods used have been quite varied, but the only one, to our knowledge, which has any similarity with the present method and which was known to the art at the time the present inventors had completed their work is that exploited by Rabi and his co-workers. Rabi's methods may be found described in various articles, of which we may mention one in The Reviews of Modern Physics, volume 18, page 323, of July 1946. In conjunction with this article one may also read two articles by the present inventors which describe some of the theory in greater mathematical detail and also give details of experiments performed with the apparatus of the present invention. The articles are to be found in the Physical Review, volume 70, pages 460 through 484, of October 1946.

It is believed that a study of the article by Rabi in conjunction with the present description will reveal that there are very broad differences between the methods. We may point out at least four such.

First, the apparatus used in the two experiments is entirely different.

Second, in Rabi's method the material is examined at very low density. Specifically, the material is examined in the gas or vapor phase and the pressure is of order of a hundred millionth of an atmosphere or less.

Third, our apparatus detects the nuclear moment directly by the voltage it induces, Rabi's method records the effect of the nuclear moments in deviating a beam of atoms.

Fourth, we require an average polarization of our sample; such average polarization of the mass of material is not sought nor obtained by Rabi.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Atom identifying apparatus for operating on a sample of matter having a predominant orientation of the magnetic poles of the nuclei thereof, comprising means applying a moving magnetic field for causing said predominant orientation to precess, and means for detecting said precession.

2. In nuclear identifying apparatus, means causing precession of a predominant orientation of the magnetic poles of nuclei, and means for detecting the precession frequency of said magnetic poles of said nuclei.

3. Apparatus for identifying the atomic constituents of a sample of matter comprising magnetic field establishing means causing the nuclei of the atoms to orient themselves in a predominant direction, magnetic means for changing the angle of said predominant direction, and means for detecting said change.

4. In apparatus for analyzing a sample of matter, means for causing the nuclei of atoms to orient themselves in a predominant direction, means for causing said predominant direction of orientation to precess, and means for detecting the precession frequency of said nuclei.

5. In apparatus for identifying atoms, magnetic means for causing the nuclei of atoms to orient themselves with their magnetic poles in a first direction, magnetic means for precessing said nuclei about said first direction, and radio frequency means for detecting said precessing.

6. Means for identifying particular varieties of atoms in samples of matter having densities greater than one millionth of a gram per liter comprising magnetic means for causing precession of the gyroscopic axes of the nuclei of said atoms and means for detecting the precession frequency of said nuclei.

7. In apparatus for identifying particular kinds of atoms, means for causing a preponderant orientation of the magnetic poles of nuclei comprising means generating a magnetic field, means for increasing the damping of the precession of said nuclei, means including a source of a magnetic field for effecting a forced precession of said preponderant orientation, and induction means responsive to the magnetic moments of said nuclei for indicating the magnitude of the voltage resulting from the precession of said magnetic poles.

8. Apparatus for identifying particular types of atoms comprising a source of a strong magnetic field uniform over the volume occupied by said atoms for orienting the atoms in a predominant direction, a source of an alternating magnetic field acting at right angles to said field for causing precession of the atoms, and high frequency detecting means responsive to the magnetic moment of said atoms while under the influence of said alternating magnetic field.

9. Apparatus for identifying particular types of atoms comprising a strong magnetic field means uniform over the volume occupied by said atoms, a rotating magnetic field means with the axis thereof at right angles to said strong magnetic field means, and high frequency detecting means responsive to magnetic fields from said atoms while under the influence of said rotating field.

10. In apparatus of the character described, electromagnetic means for causing a predominant orientation of nuclei, electromagnetic means for cyclically reversing said predominant orientation, and radio frequency means responsive to magnetic fields set up by said nuclei for detecting the occurrence of said reversal.

11. In apparatus for determining species of atoms, magnetic means for causing precession of the atoms about the direction of a magnetic field of a preponderant orientation of polarized nuclear magnetic moment at a predetermined precession rate, radio frequency detecting means responsive to said nuclear magnetic moment, cyclically varying means for changing said precession rate, and regulating means for controlling the detecting means in synchronism with said cyclic variation.

12. Apparatus for determining the ratio of the magnetic moment to angular momentum of the nuclei of atoms of a sample of matter, comprising means including a source of a cyclically varying magnetic field for polarizing the nuclear magnetic moment of a sample of matter, electromagnetic means for creating a magnetic field at right angles to said polarization, electromagnetic detecting means responsive to the precession of the magnetic moment of said nuclei, and regulating means for controlling the detecting means in synchronism with said first cyclically varying magnetic field.

13. Apparatus for identifying atoms comprising means for varying precession angle of polarized-magnetic-moment nuclei, and means for indicating said precession angle, said means for varying said precession including a coil for generating an alternating magnetic field, and said indicating means including a coil substantially at right angles thereto.

14. Apparatus as in claim 13 including an adjustable metal paddle for slightly deflecting the field associated with one of said coils.

15. A method for identifying certain kinds of atoms which comprises the steps of partially polarizing the nuclei of atoms by applying a magnetic field thereto, precessing the axis of said polarization by application of a second magnetic field at right angles to the first, and detecting the presence of said precession.

16. A method for identifying atoms comprising the steps of partially polarizing the nuclei of atoms by application of a steady magnetic field having a predetermined direction, causing the axis of said polarization to precess by application of a rotating component of magnetic field at right angles to said direction, and detecting the presence of said precession by the effect of the magnetic moments of said atoms.

17. Apparatus for measuring the strength of a magnetic field comprising a sample of matter possessing nuclei having a prescribed magnetic moment, electromagnetic means for subjecting said sample to a rotating component of magnetic field of controllable frequency, means for inserting said sample and said means into a magnetic field to be measured, and means for measuring the combined magnetic moment of said precessing nuclei as a function of said frequency.

18. Apparatus for measuring the strength of a magnetic field comprising a sample of matter possessing nuclei having a prescribed magnetic moment, means including a source of a magnetic field for subjecting said sample to a variable frequency rotating component of said field, and means for detecting a 90° precession angle of a preponderant nuclear polarization caused by said rotating component, and indicating means responsive to the frequency of said rotating component.

19. The method of measuring a magnetic field comprising the steps of insertion of a substance into said field, said substance having a known gyromagnetic ratio, subjecting said substance to a rotating component of magnetic field of controllable frequency, measuring as a function of said controllable frequency the precession of the polarized nuclear moment of said substance, thereby determining the strength of the magnetic field.

20. The method of measuring the relationship of precession frequency of atomic nuclei to the magnetic field in which precession is taking place which consists of the steps of precessing a polarization of nuclear magnetic moment in a magnetic field and detecting said precession frequency.

21. A method as in claim 20 including the step of measuring the amplitude of the precession signal.

22. The method of identifying particular kinds of atoms which consists in precessing the nuclei of a nuclearly polarized sample of matter in a magnetic field of known strength, and measuring the frequency of said precession.

23. A method as in claim 22 in which the amplitude of the signal produced by the precessing nuclei is also measured to determine the quantity of a particular kind of atom present.

24. The method of measuring magnetic fields which consists of precessing a nuclearly polarized sample of known atoms in a magnetic field of unknown strength, and measuring the frequency of nuclear precession in said sample.

25. The method of measuring the relationship of the precession frequency of atomic nuclei to the magnetic field in which precession is taking place which consists of the steps of polarizing the nuclear magnetic moment of a sample of matter, precessing said polarized moment, and detecting said precession frequency.

26. The method as described in claim 25 including the step of measuring the amplitude of the signal produced by precession of the nuclei.

27. The method of identifying particular kinds of atoms in a sample which comprises subjecting a sample of matter to a first magnetic field to polarize the magnetic moments of the nuclei thereof, in addition subjecting said sample to a rotating component of magnetic field having a component of rotation about the axis of said constant magnetic field to precess said polarized moments, and inductively measuring said precessed polarized moments.

28. The method according to claim 27 with the added step of sinusoidally varying the first magnetic field and synchronously controlling the detecting means so as to indicate the precise time in the cycle when the frequency of precession of the nuclei in the first field is equal to the rotation frequency of the rotating field.

29. The method of measuring the relationship of the precession frequency of atomic nuclei in a sample of matter to the magnetic field in which precession is taking place which comprises the steps of polarizing the combined magnetic moment of said nuclei, reversing said polarization by means of a rotating component of magnetic field having a rotation frequency, detecting the reversing process, thereby determining the rotation frequency of said rotating component for which said reversal takes place.

30. The method as described in claim 29 with the additional step of adding a paramagnetic substance to the sample to decrease the time required to produce nuclear polarization.

31. The method according to claim 29 with the added step of modulating the frequency of the rotating component of magnetic field, and synchronously controlling the detecting to indicate the precise time in the modulating cycle when the normal precession frequency in the steady magnetic field coincides with the frequency of rotation of the rotating field component.

32. In apparatus for determining the ratio of the magnetic moment to angular momentum of a sample of matter, a source of a first magnetic field, a source of a second magnetic field having a component at right angles to said first magnetic field, said sample of matter being subjected to said fields to produce torques thereon, modulating means for varying the magnitudes of said torques acting on the magnetic moments of the nuclei of said matter, detecting means responsive to the magnetic moment of said nuclei when the torque due to one of said fields is zero, whereby said ratio is determined.

33. In apparatus for identifying particular types of atoms, means including a source of a magnetic field for orienting the nuclei of said atoms in a predominant direction with respect to said first field, means including a second source of an alternating magnetic field having an adjustable frequency for causing a cyclical variation in the orientation of said nuclei relative to said first field involving a reversal of said orientation of said nuclei, and detecting means for indicating the magnitude of the combined magnetic moments of said nuclei at the instant of said reversal, whereby the Larmor frequency is determined.

34. Apparatus for identifying atoms comprising means for subjecting said atoms to a first magnetic field to effect the polarization of the magnetic moments of said atoms, further means for subjecting said atoms to an alternating magnetic field having a component at right angles to said first magnetic field to effect a variation in the precession angle of the magnetic moments of said atoms, and indicating means responsive to said magnetic moments.

35. In atomic identifying apparatus for determining the species of unknown atoms comprising means including a source of a first magnetic field, means including a source of a second magnetic field, one of said magnetic fields having a rotating component normal to the other of said fields, at least one of said means polarizing the magnetic moments of the nuclei of said unknown atoms in a predominant direction, at least one of said means being modulated for varying the precession angle of said nuclei including a reversal in said predominant direction, and means responsive to the magnetic moments of said nuclei for determining said reversal.

36. In apparatus for identifying an atomic sample by a determination of the ratio of the magnetic moment to the angular momentum of said sample comprising a source of a first cyclically varying magnetic field including an energized magnet and a set of coils all being concentrically positioned about a first axis, and a substantially low frequency electromagnetic energy source connected to said set of coils; a source of a second cyclically varying magnetic field including a coil having a second axis positioned substantially normal to said first axis, and a transmitter having an adjustable frequency output; positioning means for locating said sample substantially at the intersection of said axes, said magnetic fields for polarizing the magnetic moment of said sample in a predominant direction and precessing the sample about said predominant direction with a precession angle depending on the frequency and magnitude of said fields; a pick-up coil having an axis substantially at right angles to the aforementioned axes and further having a voltage induced therein as a function of the precessing magnetic moment of said sample; indicating means including an amplifier and oscilloscope connected to said pick-up coil for providing a visual indication of the magnitude of said magnetic moment, the horizontal sweep of said oscilloscope being connected to and synchronized with said low frequency energy source connected to said set of coils, whereby said ratio is given in terms of said frequency and the phase of the oscilloscope indication relative to said low frequency said low frequency at the instant said magnetic moment is normal to said predominant direction.

37. In apparatus for identifying a sample of matter, means for orienting portions of the atoms of the sample of matter in a predominant direction, means for causing said predominant direction of orientation of such portions to precess, and a detector for indicating the angular rate of precession.

38. In apparatus for analyzing a sample of matter, means for orienting portions of the atoms of the sample of matter in a predominant direction, means for causing said predominant direction of orientation of the portions to precess at predetermined frequencies about a predetermined axis, and a detector for indicating the angular rate of precession about said axis.

39. Apparatus for analyzing a sample of matter having its constituent elements oriented in a predominant direction comprising means for causing said predominant direction of orientation of the elements to precess about a predetermined axis, and means for detecting the angular rate of precession with respect to said axis.

40. In combination, means for producing a unidirectional field, means for producing an alternating field substantially at right angles thereto, and detecting means located adjacent to the intersection of said unidirectional and alternating fields for indicating the field strength at right angles to said unidirectional and alternating fields.

41. The combination of claim 40, wherein said alternating field alternates at adjustable radio frequencies.

*42. In combination, matter comprising atoms having portions possessing the properties of magnetic moment and gyroscopic moment, means for producing a unidirectional magnetic field enveloping said matter, energy translating means for supplying an alternating magnetic field of radio frequency for passing through said matter substantially at right angles to said unidirectional field, said atom portions precessing in said unidirectional field due to said radio frequency field and producing a radio frequency magnetic field at an angle to both said unidirectional field and said supplied alternating field, and additional energy translating means located adjacent to the intersection of said unidirectional field and said alternating magnetic fields and oriented at an angle to said first energy translating means.*

*43. In combination, matter comprising atoms having portions possessing the properties of magnetic moment and gyroscopic moment, means for supplying a unidirectional magnetic field enveloping the matter, radio frequency energy translating means coupled to said matter for supplying an alternating magnetic field of radio frequency passing into said matter substantially at right angles to said unidirectional field, said atom portions precessing in said unidirectional field due to said radio frequency field and producing a resultant radio frequency magnetic field extending at an angle to both said unidirectional field and said supplied alternating field, and additional radio frequency energy translating means coupled to the matter and oriented at an angle with respect to the first energy translating means for carrying radio frequency energy passing out from the matter after the energy passing through the matter has reacted with the precessing atom portions in the matter.*

*44. In combination, matter comprising atoms having portions possessing the properties of magnetic moment and gyroscopic moment, means for producing a unidirectional magnetic field enveloping the matter, energy translating means having a part thereof for conveying an alternating magnetic field of radio frequency into the matter, said alternating field extending substantially at right angles to the unidirectional field for causing the atom portions of the matter to precess in the unidirectional field due to the radio frequency field and thereby produce a radio frequency magnetic field at an angle with respect to both the unidirectional field and the first alternating field, said energy translating means having another portion thereof for conveying radio frequency magnetic field energy out from the matter.*

*45. Apparatus for measuring the strength of an unknown unidirectional magnetic field including matter comprising portions of atoms having known gyromagnetic properties, means for positioning the matter in the unknown field to thereby orient a preponderance of the atom portions in the direction of the field, means for supplying a controllable radio frequency magnetic field to the matter substantially at right angles to the unknown field to cause the oriented atom portions to precess in the unknown field at the frequency of the applied radio frequency field, and electromagnetic means for detecting the magnetic field produced by the precessing atom portions.*

*46. The method for measuring the strength of an unknown unidirectional magnetic field which comprises positioning a sample of matter comprising portions of atoms having known gyromagnetic properties within the unknown field, supplying a controllable radio frequency alternating field to the matter substantially at right angles to the unknown field, detecting the precession of the portions of the atoms in the unknown field due to the applied radio frequency field by picking up the radio frequency magnetic field produced by the precessions, and determining the strength of the unknown field from the values of the frequency of the detected radio frequency field and the known gyromagnetic properties of the atom portions.*

*47. The method for identifying certain kinds of atoms which comprises the steps of polarizing atom portions possessing gyromagnetic properties by applying a unidirectional magnetic field thereto, applying a radio frequency magnetic field thereto substantially at right angles to the unidirectional magnetic field to thereby precess the axis of said polarization, and detecting the radio frequency magnetic field set up by the gyromagnetic bodies precessing in the unidirectional magnetic field, the frequency of said detected precession serving to determine the kind of atom.*

*48. In combination, matter comprising atoms having portions possessing the properties of magnetic moment and gyroscopic moment polarized in a field in which the portions may precess, energy translating means for supplying an alternating magnetic field of radio frequency to said matter substantially at right angles to said polarizing field, said atom portions precessing in said polarizing field due to said radio frequency field and producing a radio frequency magnetic field at an angle to both said polarizing field and said supplied alternating field, and additional energy translating means located adjacent to the intersection of said polarizing field and said alternating magnetic fields and oriented at an angle to said first energy translating means.*

*49. The method of obtaining an energy output from an ensemble of portions of atoms possessing the properties of magnetic moment and gyroscopic moment polarized in a field in which the portions may precess comprising the steps of applying an alternating magnetic field of radio frequency energy to the matter having a field component at right angles to said polarizing field to*

*thereby cause said atom portions to precess in said polarizing field due to said applied radio frequency field and produce a radio frequency magnetic field at an angle to both said polarizing field and said applied alternating field, and detecting the magnetic field produced by the precessing atom portions.*

*50. Apparatus for producing periodic resonance between the frequency of precessions of portions of atoms possessing the properties of magnetic moment and gyroscopic moment and a radio frequency field applied to such portions comprising, means for producing a unidirectional magnetic field for enveloping a volume of matter containing the portions of atoms, means for producing a radio frequency magnetic field substantially normal to said unidirectional magnetic field to thereby cause said portions to precess in the unidirectional field and means for providing an audio frequency field for modulating the unidirectional magnetic field.*

*51. The method of producing periodic resonance between the frequency of precession of portions of atoms having the properties of gyroscopic moment and magnetic moment and a radio frequency field applied to the portions which comprises, the steps of positioning a volume of matter containing the portions of atoms within a unidirectional magnetic field, applying the radio frequency field to said matter substantially at right angles to said unidirectional magnetic field to thereby cause said portions to precess in said unidirectional magnetic field, and modulating the unidirectional magnetic field with an audio frequency magnetic field to thereby periodically sweep through the region of resonance.*

*52. Apparatus for measuring the strength of a unidirectional magnetic field comprising a volume of matter containing portions of atoms possessing the properties of magnetic moment and gyroscopic moment adapted to be positioned in said unidirectional magnetic field, means for providing a variably controlled radio frequency magnetic field to the matter substantially normal to the unidirectional magnetic field to thereby cause said portions to precess in said unidirectional magnetic field at a frequency in resonance with the applied radio frequency field and means for modulating said unidirectional magnetic field with an audio frequency magnetic field to thereby periodically sweep through the region of resonance.*

*53. In combination with apparatus as claimed in claim 52, means for indicating resonance between the portions of atoms precessing in the modulated unidirectional magnetic field and the applied radio frequency field.*

*54. In combination, a volume of matter containing portions of atoms having the properties of magnetic moment and gyroscopic moment, means including a source of a first magnetic field enveloping the matter, means including a source of a second magnetic field enveloping the matter, one of said magnetic fields having a rotating component normal to the other field, at least one of said means polarizing the magnetic moments of the portions of atoms in a predominant direction, at least one of said means being modulated for varying the precession angle of the portions including a reversal in said predominant direction, and means responsive to the magnetic moments of said portions for determining said variation.*

*55. In combination, means for positioning a volume of matter containing portions of atoms having the properties of magnetic moment and gyroscopic moment within a unidirectional magnetic field to thereby polarize the portions, means for providing a radio frequency magnetic field to the matter substantially at right angles to the unidirectional field to cause the portions to precess in the unidirectional field at the frequency of the applied radio frequency field, and means for modulating at least one of the fields with an audio frequency.*

*56. Apparatus for producing resonance between the frequency of precession of portions of atoms having the properties of gyroscopic moment and magnetic moment and a radio frequency field applied to the portions comprising means containing a volume of matter having said portions of atoms adapted to be located in a unidirectional magnetic field, and means including a coil of wire for applying a radio frequency magnetic field to said matter at an angle to said unidirectional field to thereby cause said portions to precess in said unidirectional magnetic field at a frequency in resonance with the applied radio frequency field and for detecting the resonance.*

*57. A passive network comprising a polarized medium, input means to supply an alternating voltage $V_1$ to said medium to produce an alternating current flow $I_1$ in said input means, output means coupled to said medium to obtain an alternating voltage $V_2$ producing a current flow $I_2$ in said output means, said medium possessing gyromagnetic characteristics and including material having an anisotropic polarization property wherein:*

$$V_1 = -SI_2$$
$$V_2 = SI_1$$

*where S is a constant.*

*58. A passive four-terminal network comprising a polarizable medium possessing gyromagnetic properties, input terminals to apply an input voltage and an input current to said network, output terminals to take an output voltage and an output current from said network, means to polarize said medium in a first direction, means connected to said input terminals to produce a primary field in said medium in a second direction different from said first direction, said primary field producing in said polarized medium a secondary field having a third direction different from said first and second directions, and means coupled to said secondary field to produce said output voltage and output current at said output terminals.*

*59. A circuit arrangement having a passive four-terminal network comprising a polarizable medium possessing gyromagnetic properties, input terminals to apply an input voltage and an input current to said network, output terminals to take an output voltage and an output current from said network, means to polarize said medium in a first direction, means connected to said input terminals to produce a primary field in said medium in a second direction different from said first direction, said primary field producing in said polarized medium a secondary field having a third direction different from said first and second directions, and means coupled to said secondary field to produce said output voltage and output current at said output terminals, the relation between said input voltage $V_1$, said input current $I_1$, said output voltage $V_2$ and said output current $I_2$ being*

$$V_1 = Z_{11}I_1 + Z_{12}I_2$$
$$V_2 = Z_{21}I_1 + Z_{22}I_2$$

*wherein $Z_{11}$ is the input impedance of the network, $Z_{22}$ is the output impedance of the network and $Z_{21}$ and $Z_{12}$ are transfer impedances having unequal magnitude.*

*60. A passive four-terminal network comprising a polarized medium possessing gyromagnetic properties, said medium being polarized in a first direction, input terminals to apply an input voltage and an input current to said network, output terminals to take an output voltage and an output current from said network, means connected to said input terminals to produce a primary field in said medium in a second direction different from said first direction, said primary field producing in said polarized medium a secondary field having a third direction different from said first and second directions, and means coupled to said secondary field to produce said output voltage and output current at said output terminals.*

*61. In combination, a volume of matter containing portions of atoms having the properties of magnetic moment and gyroscopic moment, means producing a polarizing magnetic field thereby determining a resonant frequency of said atom portions, means for producing electric energy of a prescribed frequency, means for coupling said energy to said atom portions, and means for periodically bringing the frequency of said energy producing means and the resonant frequency of said atom portions into coincidence.*

References Cited in the file of this patent or the original patent

UNITED STATES PATENTS

| | | |
|---|---|---|
| 1,943,619 | Mudge et al. | Jan. 16, 1934 |
| 2,065,118 | Davis | Dec. 22, 1936 |
| 2,365,073 | Haight | Dec. 12, 1944 |
| 2,370,194 | Riggs | Feb. 27, 1945 |
| 2,415,789 | Farrow | Feb. 11, 1947 |
| 2,468,554 | Hull | Apr. 26, 1949 |
| 2,488,341 | Slonczewski | Nov. 15, 1949 |

OTHER REFERENCES

Physical Review, vol. 69, Nos. 1 and 2, page 37.